March 18, 1952 J. C. TELLIER 2,589,455

REFLEX SUPERREGENERATIVE RECEIVER

Filed Sept. 5, 1946

INVENTOR.
JOSEPH C. TELLIER
BY
Brown, Denk & Synnestvedt
AGENTS

Patented Mar. 18, 1952

2,589,455

UNITED STATES PATENT OFFICE 2,589,455

REFLEX SUPERREGENERATIVE RECEIVER

Joseph C. Tellier, Penn Wynne, Pa., assignor to Philco Corporation, Philadelphia, Pa., a corporation of Pennsylvania Application September 5, 1946, Serial No. 695,017

6 Claims. (Cl. 250—20)

This invention relates to vacuum tube oscillators and their applications. More specifically, it relates to a special form of vacuum tube oscillator adapted to oscillate alternately at two different frequencies, and which is particularly adapted for use as a detector of angular velocity-modulated carrier wave signals.

In the latter connection there is described, in Patent 2,351,193 of June 13, 1944, to Murray G. Crosby for a Frequency Modulation Detector Circuit, a method of detecting angular-velocity modulated carrier wave signals whereby two superregenerative detectors are operated at different frequencies respectively above and below the center, or carrier, frequency of the angular-velocity modulated carrier wave signal to be detected. The two detectors are alternately quenched and unquenched to permit oscillations to build up in their tank circuits at a rate determined by the extent of modulation of the carrier wave signal at the time of unquenching. The outputs of the two detectors are combined so as to yield a signal which varies in accordance with the angular velocity modulation of the input carrier, but which is substantially independent of variations in the amplitude of said carrier. The circuit shown in the patent for applying this method employs separate tubes for the two superregenerative oscillators, two additional tubes comprising a quench controlling oscillator, and yet another tube to vary the tuning of a common tank circuit used in conjunction with both superregenerative oscillators.

It is an object of the present invention to provide a novel and improved circuit, adapted to operate substantially in accordance with the method of the aforementioned patent, in which the number of tubes employed is reduced to two, or their equivalent. This objective is achieved by reflexing the tubes to operate both separately as superregenerative oscillators and, in cooperation one with the other, as a quench controlling oscillator. In this manner the need for a separate reactance tube to vary the tuning of the superregenerative oscillator tank circuit is also obviated, and the stability and reliability of the detector as a whole is substantially improved.

Although particularly adapted for use as a superregenerative detector of frequency- or phase-modulated carrier wave signals (generically referred to as angular-velocity modulated carrier wave signals), the arrangement thus provided by the invention is also adapted for use wherever it is desired alternately to generate oscillations at two substantially different frequencies, and it therefore has other applications which need not here be enumerated.

Figures 1, 5:
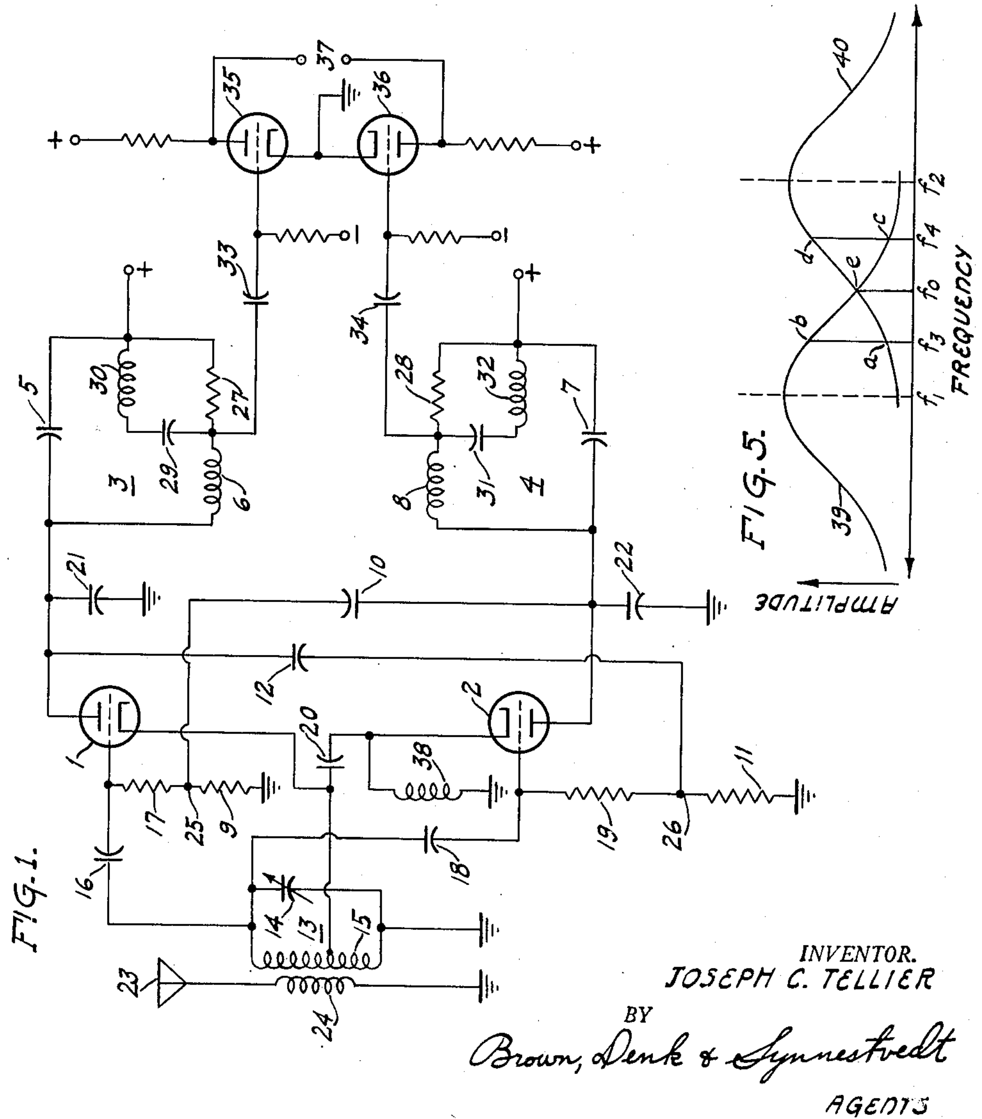

The principles of the invention and its mode of operation will be fully understood upon consideration of the following description, making reference to the drawings in which:

Figure 1 is the schematic diagram of a representative embodiment of the invention, and Figures 2, 3, 4 and 5 are diagrams which will be referred to in explaining the principle of the invention and the operation of the embodiment in accordance with Figure 1.

Referring to Figure 1, the low frequency oscillator, which controls the quenching and unquenching of the two separate superregenerative detectors above referred to, comprises the triode vacuum tubes 1 and 2 and tuned circuits 3 and 4 plus other components hereinafter to be mentioned. Tuned circuits 3 and 4 comprise condensers 5 and 7 respectively and inductors 6 and 8 respectively. Each of these circuits is connected between the plate of one of the oscillator tubes and a source of positive potential. Both circuits are tuned to resonate at the desired quench frequency, which preferably should be outside the audible range, yet as low as possible to provide for a relatively long build-up time between successive unquenchings of each superregenerative oscillator. The latter condition is conducive to high sensitivity in the superregenerative oscillators, the need for which will hereinafter become apparent.

Also included in the low frequency, or quench, oscillator circuit are resistors 9 and 11 and condensers 10 and 12. The resistors 9 and 11 respectively are included in the connections from the grids of tubes 1 and 2 to ground, while condensers 10 and 12 respectively connect the grids of each of these tubes to the plate of the other. The time constants of the RC circuits, formed respectively by resistor 9 and condenser 10 and by resistor 11 and condenser 12, are determined in accordance with the frequency of the low frequency oscillator, and, if, for example, this is 50 kilocycles, the component values may be as follows:

| | | |
|---|---|---|
| Resistors **9** and **11** | ohms | 100,000 |
| Condensers **10** and **12** | $\mu\mu$ farads | 1,000 |

The oscillator thus constituted is very similar, both as to configuration and mode of operation, to a conventional multivibrator. It is here used, in place of the somewhat less complicated multivibrator, to generate a substantially sinusoidal quenching wave, whereby sufficient time is permitted to elapse, between the quenching of one superregenerator and the unquenching of the other, to prevent ringing of the tank circuit which is common to both of the superregenerative oscillator circuits hereinafter to be described. In other applications of the invention than the one presently to be described, however, it may be found desirable to utilize another form of low frequency oscillator, such, for example, as the multivibrator, and it is to be understood that the invention contemplates the use of such other forms.

Triodes 1 and 2 also cooperate individually with tuned circuit 13, comprising condenser 14 and inductor 15, to form two distinct and separate superregenerative oscillators. To this end, the grids of the two triodes are connected respectively through condensers 16 and 18 to one side of parallel-tuned circuit 13. The other side of the tuned circuit may be connected to ground as shown. The cathodes of both triodes 1 and 2 are connected to a common tap on inductor 15 of tuned circuit 13, so that a portion of inductor 15 is included in both grid and plate circuits of both triodes. This provides, in each instance, the necessary feedback required for oscillation. In order that one of the superregenerative oscillators may have a frequency of oscillation different from that of the other, condenser 20 is included in the connection from the cathode of triode 2 to the tap on inductor 15. Tuned circuit 13 may, for example, have a resonant frequency somewhere in the range of from 40 to 50 megacycles, and condenser 20 may have a value of 40$\mu\mu$ farads, which will be such as to produce a difference in the frequencies of oscillation of the two superregenerators of approximately 200 kilocycles. The presence of condenser 20 makes necessary the provision of a D.-C. return to ground for the cathodes of tubes 1 and 2. This is provided, without short-circuiting tank circuit 13, by means of a choke 38 which is preferably self-resonant at the same frequency as tuned circuit 13. Included in the connections from the grids of each of tubes 1 and 2 to ground, are resistors 17 and 19 respectively. The RC circuits thus formed by condenser 16 and resistor 17, and by condenser 18 and resistor 19, may have time constants corresponding to the frequencies of oscillation of the two superregenerative oscillators. Thus, for example, condensers 16 and 18 may each have a value of 50$\mu\mu$-farads, while resistors 17 and 19 may have values of 10,000 ohms. The latter values will be sufficiently small, compared to the values of resistors 9 and 11, to permit operation of the low frequency or quench oscillator in the manner hereinbefore described. At the same time, they will serve as isolating resistors to prevent undue loading of tuned circuit 13 owing to the presence of condensers 10 and 12 in the low frequency oscillating circuit. Condensers 21 and 22 serve to by-pass components at the super-regenerative oscillator frequency from the plates of tubes 1 and 2 respectively to ground, and each may have a value of 100$\mu\mu$-farads. Resistors 17 and 19 perform additional functions, as will presently be set forth, in shaping the quench waveforms applied to the grids of tubes 1 and 2, and in developing the necessary self-biases for operation of the two superregenerative oscillators.

Figure 2:
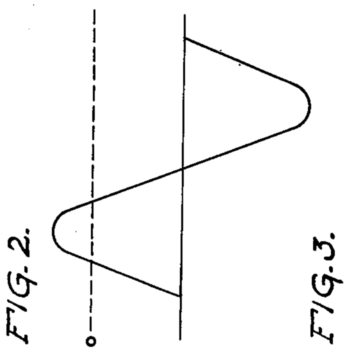
Figure 3:
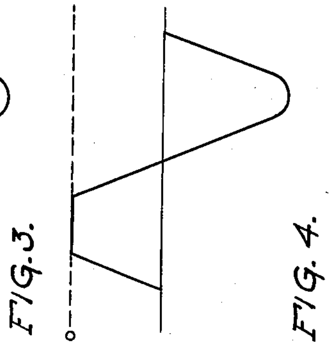

The quench waveform produced by the low frequency oscillator is applied to the grids of tubes 1 and 2 in phase opposition, so that, while the potential at point 25 is positive with respect to ground, that at point 26 is negative, and vice versa. In the absence of resistors 17 and 19, the quench waveform applied to the grid of one of the tubes would be substantially as represented in Figure 2. This would cause the grid potential of the tube to rise substantially above cut-off level so that the build-up of oscillations in tank circuit 13 would depend upon the mutual conductance of the tube. It is unlikely that the characteristics of the two tubes would be identical, and this would give rise to discrepancies between the modes of operation of the two superregenerators which would adversely affect the ability of the system as a whole to eliminate amplitude modulation in the received signal. The presence of resistors 17 and 19 avoids this difficulty by limiting the amplitudes of the quenching signals applied to the grids of tubes 1 and 2 in the manner shown in Figure 3. This is accomplished by reason of the fact that the grid of each tube draws current as it goes positive, and thereby negative biases are developed across resistors 17 and 19 respectively to compensate the rise in potential above ground at points 25 and 26.

At a time subsequent to that at which the potential on the grid of either of tubes 1 or 2 reaches and slightly exceeds the cut-off level, oscillations of appreciable amplitude will commence to build up in tuned circuit 13. Such commencement of oscillations will occur sooner or later, after this point of unquenching has been reached, depending upon the amplitude and frequency of signal present in tank circuit 13 at the time of unquenching. As these oscillations build up, self-bias is developed across either resistor 17 or resistor 19, so that successive RF peaks in the voltage developed across tuned circuit 13 tend to exceed this self-bias by only a relatively small amount. Thus oscillations are permitted to build up to a substantial value before tube overload occurs. After overload has occurred, oscillation will continue at approximately the overload level until the potential of the quench-controlling signal falls sufficiently to cause the tube to cut off.

Figure 4:
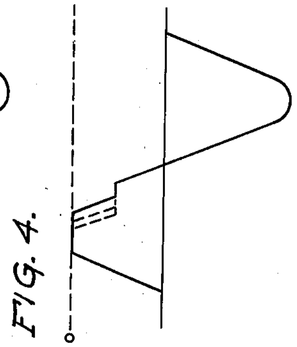

As a result of delay in the commencement of build-up of oscillations, after the time at which unquenching occurs, the waveform appearing on the grid of the oscillator tube will be modified so as to correspond, for example, to the solid line representation in Figure 4. For different values of signal in tank circuit 13 at the time of unquenching, buildup may commence at different times, and the quenching waveform appearing on the grid of the tube will be correspondingly modified as represented by the broken line modifications in Figure 4. More specifically, if a modulated carrier wave signal is impressed upon tank circuit 13, the time at which oscillations commence to build up will depend upon the instantaneous value of modulation at the time when one of the oscillator tubes commences to conduct. Thus the durations of successive unquenched intervals of each superregenerator circuit, and hence the magnitudes of their outputs, will vary as a function of the modulation of the input carrier wave signal. Concurrently the wave appearing on the grid of each tube will vary at the modulation rate so as, for example, to assume, during each cycle, one of the representative forms shown in Figure 4.

When the circuit is used as a detector of angular-velocity modulated carrier wave signals, input signal from an antenna 23 may be supplied to tank circuit 13 through an inductor 24 coupled to tank circuit inductor 15. Output from each of the superregenerative oscillators may be derived across resistors 27 and 28, respectively connected in series with inductors 6 and 8 of tank circuits 3 and 4 of the low frequency, or quench, oscillator. Resistors 27 and 28, whose values may be 1,000 ohms each, are preferably by-passed by series resonant circuits 29, 30 and 31, 32 respectively, each tuned to the quench frequency. The values of condensers 29 and 31 and of resistors 27 and 28 may be made such as to de-emphasize high frequency components of the detected signal. This is desirable when, as is customary in FM transmission, high frequency components of the intelligence signal are emphasized, before being used to modulate a high frequency carrier, in order to reduce the effect of noise upon them in the course of transmission and reception. Thus, for example, condensers 29 and 31 may each have a value of 0.1 $\mu$-farad, while inductors 31 and 32 may have values of 100 $\mu$-henries. The separate detected outputs from the two superregenerative oscillators, developed across resistors 27 and 28 respectively, are supplied through coupling condensers 33 and 34 to the grids of tubes 35 and 36. These tubes serve to subtract the outputs from the two separate detectors so as to yield, across terminals 37, a detected output signal containing variations corresponding to the frequency or phase modulation of the input signal, but in which variations in the amplitude of said signal are substantially eliminated. The reason for this will be apparent from a consideration of Figure 5.

The oscillating frequencies of the two superregenerative detectors of the circuit of Figure 1 are adjusted so as to be displaced by equal amounts on either side of the center or carrier frequency of the angular velocity-modulated carrier wave signal to be received. This yields the two overlapping frequency response characteristics 39 and 40 as shown in Figure 5 with center frequencies $f_1$ and $f_2$, respectively above and below the center carrier frequency $f_0$. In the absence of frequency modulation of the input signal, the outputs of both superregenerative receivers will be equal and will correspond to the ordinate $f_0e$, as shown in Figure 5. Subtraction of these two signals in the amplifier comprising tubes 35 and 36 in the circuit of Figure 1 will produce a net output of zero. If the frequency of the input carrier wave signal is modulated so as to deviate below the center frequency $f_0$ to a frequency $f_3$, then the outputs of the two oscillators will be represented respectively by the ordinates $f_3a$ and $f_3b$ in Figure 5. The difference between these two, and hence the net output of the detector derived at terminals 37 in Figure 1, will be proportional to the difference, $ab$, between these two ordinates. Likewise, if the input carrier wave signal is modulated so as to deviate to a frequency $f_4$ above the center frequency $f_0$, the outputs of the two detectors will correspond to the ordinates $f_4c$ and $f_4d$ respectively. In this instance the net output at terminals 37 will be proportional to the difference, $cd$, between these two ordinates. Variations in the amplitude of the input carrier wave signal will produce corresponding increases in the outputs from both detectors, regardless of the amount by which the frequency of the signal is deviated, and such increases in output will tend to cancel out in the output from tubes 35 and 36 derived at output terminals 37.

Although the invention has been particularly described with reference to its application as a detector of angular-velocity modulated carrier wave signals, it will be apparent to those skilled in the art that, basically, the arrangement shown in Figure 1 is an oscillator for alternately producing oscillations at two different frequencies. As such it has numerous other applications. Also it will be apparent that certain modifications to the circuit shown in Figure 1 may be made without departing from the scope of the invention as defined in the appended claims. Thus, with reference to the embodiment disclosed, it is not essential that the two tubes, which function separately and individually as superregenerative oscillators, both be employed, in cooperation one with the other as shown, to constitute a balanced push-pull low frequency quench oscillator. Although, both tubes being available, it appears preferable to use them in this manner, it is equally feasible, as will readily be apparent, to use but one of them to form a low frequency oscillator to control the quenching of both superregenerative oscillators. Such a circuit is achievable by combining tank circuits 3 and 4 in the embodiment of Figure 1 and by making other slight and obvious modifications to the circuit. Other modifications of a like nature will readily occur to those seeking to apply the invention in accordance with the principles hereinbefore set forth.

I claim:

1. In a superregenerative receiver of angular-velocity modulated carrier wave signals, a tank circuit resonant at a relatively high frequency and supplied with said modulated signals, a first oscillator comprising said tank circuit together with a vacuum tube and first means coupling said tank circuit to said vacuum tube, a second oscillator comprising said tank circuit and another vacuum tube together with second means coupling said tank circuit to said other vacuum tube, each of said tubes having at least triode elements, means included in said coupling means for causing said first and second oscillators to oscillate at different frequencies respectively above and below said carrier frequency, a third oscillator comprising said tubes and a pair of tuned circuits, each tuned to a frequency lower than said first resonant frequency and each connected in the plate circuit of one of said tubes, said tuned circuits cooperating with said tubes to produce oscillations at a relatively low frequency as determined by said tuned circuits so as to render said tubes alternately conducting, whereby said separate oscillators are rendered alternately and intermittently operative as superregenerative amplifiers, means included in the plate circuits of each of said tubes for deriving outputs from said separate oscillators, and means combining said outputs to yield a signal which varies in substantial accordance with the frequency deviation of said modulated carrier.

2. In a vacuum tube oscillator system, a tank circuit resonant at a relatively high frequency, a first oscillator comprising said tank circuit and a vacuum tube associated therewith together with means coupling said tank circuit to said tube, a second oscillator comprising said tank circuit and another vacuum tube together with second means coupling said tank circuit to said tube, each of said tubes having at least triode elements, means included in said coupling means for causing said first and second oscillators to oscillate at different frequencies, and a third oscillator comprising said tubes and a pair of tuned circuits, each tuned to a frequency lower than said first resonant frequency and each connected in the plate circuit of one of said tubes, said tuned circuits cooperating with said tubes to produce oscillations at a relatively low frequency as determined by said tuned circuits so as to render said tubes alternately conducting, whereby said first and second oscillators are rendered alternately and intermittently operative.

3. In a vacuum tube oscillator system: a first oscillator operating at a relatively low frequency and comprising a pair of vacuum tubes together with circuit means for rendering said tubes alternately conductive; a first intermittently-operative oscillator comprising a tuned circuit resonant at a relatively high frequency, one of said alternately-conductive vacuum tubes, and means coupling said tuned circuit to said last-named tube; a second intermittently-operative oscillator comprising said tuned circuit and the other of said vacuum tubes, together with second means coupling said tuned circuit to said other tube; each of said intermittently-operative oscillators being operative only during intervals of conduction of the vacuum tube which it comprises; the effective impedance of said first coupling means differing from that of said second coupling means by an amount sufficient to produce substantially different oscillation frequencies in said first and second oscillators during their respective periods of operation.

4. A system in accordance with claim 3, in which said first oscillator includes reactive means for preventing both of said vacuum tubes from conducting for a substantial period of time between successive intervals of conduction thereof.

5. In a vacuum tube oscillator system: a first oscillator comprising a pair of vacuum tubes and a tuned circuit resonant at a relatively low frequency and coupled to said vacuum tubes; means included in said oscillator for establishing phase opposition of the oscillations thereof at the grids of said tubes whereby said tubes are rendered alternately and intermittently conductive; a second, intermittently-operative oscillator, comprising a second tuned circuit resonant at a relatively high frequency, one of said alternately-conductive vacuum tubes, and means coupling said second tuned circuit to said last-named tube; a third, intermittently-operative oscillator, comprising said second tuned circuit and the other of said vacuum tubes, together with second means coupling said second tuned circuit to said other tube; the effective impedance of said first coupling means differing from that of said second coupling means by an amount sufficient to produce substantially different oscillation frequencies in said second and third oscillators.

6. In a superregenerative receiver of angular velocity modulated carrier wave signals, a first oscillator comprising a pair of vacuum tubes and adapted to oscillate at a relatively low frequency; a tuned circuit resonant at a relatively high frequency and supplied with said modulated signals; a second oscillator comprising said tuned circuit together with one of said vacuum tubes and first means coupling said tuned circuit to said last-named vacuum tube; a third oscillator comprising said tuned circuit and the other of said vacuum tubes together with second means coupling said tuned circuit to said other tube; the effective impedance of said first coupling means differing from that of said second coupling means by an amount sufficient to cause said second and third oscillators to oscillate at substantially different frequencies, the frequencies of said second and third oscillators lying respectively above and below the frequency of said carrier waves; means causing said first oscillator to render said vacuum tubes alternately conducting, whereby said second and third oscillators are rendered alternately and intermittently operative as superregenerative amplifiers; and means deriving outputs from said second and third oscillators and combining said outputs to yield a signal which varies in substantial accordance with the frequency deviation of said modulated carrier wave.

JOSEPH C. TELLIER.

REFERENCES CITED

The following references are of record in the file of this patent:

UNITED STATES PATENTS

| Number | Name | Date |
|---|---|---|
| 1,424,065 | Armstrong | July 25, 1922 |
| 1,787,979 | Hansell | Jan. 6, 1931 |
| 2,091,546 | Hruska | Aug. 31, 1937 |
| 2,297,926 | Usselman | Oct. 6, 1942 |
| 2,351,193 | Crosby | June 13, 1944 |
| 2,363,651 | Crosby | Nov. 28, 1944 |
| 2,416,794 | Crosby | Mar. 4, 1947 |

FOREIGN PATENTS

| Number | Country | Date |
|---|---|---|
| 389,225 | Great Britain | Mar. 16, 1933 |